Patented Sept. 18, 1951

2,568,034

UNITED STATES PATENT OFFICE 2,568,034

HORTICULTURAL COMPOSITION COMPRISING POLYETHYLENE POLYSULFIDE AND SULFUR OR LIME-SULFUR

William D. Stewart, Yonkers, N. Y., assignor to The B. F. Goodrich Company, New York, N. Y., a corporation of New York No Drawing. Application April 11, 1947, Serial No. 740,968

3 Claims. (Cl. 167—20)

This invention relates to horticultural spray compositions, and more specifically pertains to synergistic spray adjuvants for sulphur and lime-sulphur spray compositions.

Sulphur and lime-sulphur are widely used in the agricultural and horticultural industries for insecticidal and fungicidal purposes. Elemental sulphur in its many modified forms can be used as a dust or can be dispersed in an aqueous medium and used as both a fungicide and an insecticide. Lime-sulphur is almost entirely employed either as an aqueous solution freshly prepared by the reaction of an aqueous suspension of calcium hydroxide with some form of elemental sulphur or as a commercially available aqueous solution. Dry lime-sulphur compositions are also used but are not as widely used as the solutions. The term "lime-sulphur" is employed to include all the products of the reaction of calcium hydroxide with sulphur. When sulphur or lime-sulphur is employed in spray compositions, it is usually the practice to add an adhesive or sticking agent to the dust or spray composition to prevent the sulphur or lime-sulphur from being washed off or leached from the treated plants by the action of rainfall. Some wetting and spreading agents such as milk products, flour, gelatin, blood albumen, bentonite and other clays have found some use as sticking agents. While some oils and especially fish oils have been found to be the most important of the adhesives, for other insecticides and fungicides, they cannot be employed with sulphur and lime-sulphur. For, as reported in the literature, the use of a spray composition containing an oil and sulphur or lime-sulphur and an oil on plants results in considerable damage to the plant foliage. Not only can such combinations of oil and sulphur or oil and lime-sulphur not be used without serious foliage injury, but sulphur or sulfide containing sprays cannot follow or be followed by a spray composition containing an oil unless a time interval of at least two weeks has elapsed.

I have discovered a class of spray adjuvants for sulphur and lime-sulphur which not only provides for convenient mixing and applying of the spray compositions, but also provides a means of retaining and building up of the sulphur and lime-sulphur spray deposit even though the deposit is subjected to heavy rainfall. Another advantage which is achieved by the use of my spray compositions is that the biological activity of sulphur or lime-sulphur is increased by a synergistic effect of this new class of spray adjuvants. These new spray compositions are conveniently and readily prepared by merely mixing sulphur or lime-sulphur with an aqueous dispersion of a polymeric organic polysulfide especially those aqueous dispersions of polymeric organic polysulfides which are capable of microscopic, translucent, discontinuous, rubbery films on drying. These preferred aqueous dispersions of polymeric organic polysulfides are more completely hereinafter defined.

The polymeric organic polysulfides which are preferred for the purposes of my invention are those which have the general formula for the structural molecular units of $[-R-S_x-]$ where R is an organic radical having no sulphur-to-sulphur linkage, and $x$ of $S_x$ has a value of from 2 to 5 or more. It is also preferred that these polymeric organic polysulfides be present in an aqueous dispersion of latex-like quality having a particle size of the polymeric organic polysulfides of about 1 to 10 microns and having the property of forming microscopic, translucent, discontinuous, rubbery films on drying, for the tenacity of the spray deposit of these polymeric organic polysulfides and the rubber-like properties of the polymer are conjoined.

The elastic properties of these polymers are regulated both by the number of atoms in the organic radical, which has no sulphur-to-sulphur linkage, and by the number of sulphur atoms linked to said organic radical. Accordingly, the larger the number of non-sulphur atoms separating the sulphur groups within the molecules, the more rubber-like are the properties of the polymer. Also the greater the number of sulphur atoms linked to the organic radicals, the more rubbery becomes the polymer. For example, the polymeric material $$[-CH_2-S-S-]_n$$
$$|$$
$$S$$

is a powdery material, while $$[-CH_2-\underset{S}{\overset{S}{|}}-S-]_n$$
$$| \ |$$
$$S \ S$$

and $$[-C_2H_4OC_2H_4-S-S-]_n$$
$$|$$
$$S$$

are rubber-like polymers.

The preferred polymeric organic polysulfides can be prepared as latex-like aqueous dispersions by the methods disclosed in my copending applications, Serial No. 599,316, filed June 13, 1945, now Patent No. 2,470,115, Serial No. 599,317, filed June 13, 1945, now Patent No. 2,470,529, and in U. S. Patent No. 2,102,564.

Essentially, the polymeric organic polysulfides with which my invention is concerned are prepared by condensing a water-soluble polysulfide such as sodium, potassium or calcium polysulfide having from 2 to 5 or more sulphur atoms per molecule with such organic compounds as formaldehyde or those which have the graphical skeleton structural formula:

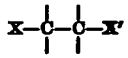

where

represents two adjacent carbon atoms or

where

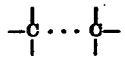

represents two carbon atoms separated by and joined to an intervening organic structure and where X and X' represent substituents which split off during the condensation reaction. The intervening organic structure between the pair of carbon atoms in the latter class of reactant compounds may be one of the following organic linkages: a saturated straight-chain hydrocarbon radica, a saturated branch-chain hydrocarbon radical, an unsaturated hydrocarbon chain radical, an ether linkage, a thioether linkage, an organic radical containing an ether or a thioether linkage, an aromatic hydrocarbon linkage, as well as other organic radicals. Tri-substituted and tetra-substituted organic compounds can also be used provided that the substituents are in the nature of X and X'. The X and X' constituents, which are split off by reacting with the cation of the water-soluble polysulfide reactant can be halogen, acid-sulphate, nitrate, acid phosphate, bicarbonate, formate, acetate, propionate, laurate, oleate and others.

More specifically, the organic compounds which can be employed as reactants to form the polymeric organic polysulfide condensation products are for example ethylene dichloride and dibromide, propylene dichloride and dibromide, the dichlorides and dibromides of unsaturated hydrocarbon gases derived from pressure-cracking processes and natural gas-cracking processes, the reaction products of these unsaturated hydrocarbon gases with sulphur dichloride, as well as such disubstituted compounds of which the following are examples and where X and X' have the same significance as hereinbefore described:

A,A'-disubstituted ethyl ether

XCH₂CH₂OCH₂CH₂X'

B,B'-disubstituted ethyl ether

XCH₂OCH₂X'

Disubstituted methyl ether

XC₂H₄OC₂H₄OC₂H₄X'

Disubstituted ethoxy ethyl ether

XCH₂SCH₂X'

Disubstituted thiomethyl ether

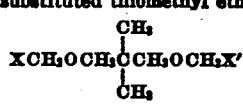

Disubstituted 1,3-dimethoxy 2,2-dimethyl propane

XC₃H₆OCH₂OC₃H₆X'

Disubstituted diethyl formal

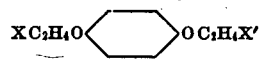

Disubstituted para diethoxy benzene

XCH₂OCH₂CHOCH₂
              |
              X'

Disubstituted dimethoxy ethane

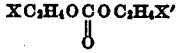

Disubstituted diethyl carbonate

Disubstituted glycol diacetate

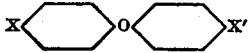

p,p'-Disubstituted diphenyl ether

p,p'-Disubstituted dibenzyl ether

XC₂H₄SO₂C₂H₄X'

Disubstituted diethyl sulfone

C₂H₅CHOCHC₂H₅
     |      |
     X      X'

A,A'-disubstituted propyl ether

p,p'-Disubstituted benzene

p,p'-Disubstituted para xylene

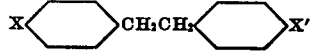

p,p'-Disubstituted dibenzyl

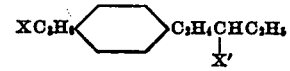

Disubstituted para hexyl benzene

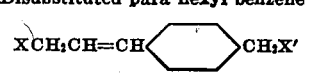

Disubstituted 3-tolyl propene-2 and others as well as compounds have more than two reactive substituents such as 1,1,2-trichlor ethane, 1,2,4-trichlor butane, 1,2,3,4-tetrachlor butane, trichlor mesitylene, and 2,2-bis-(parachlorophenyl) 1,1,1-trichloroethane.

The stable latex-like aqueous dispersion having the preferred characteristics hereinbefore described can be prepared by carrying out the condensation reaction in the presence of an aqueous solution of a salt stable emulsifying or dispersing agent. Compounds which are suitable emulsifying or dispersing agents are lignin sulfonates, alkyl benzene sulfonates having more than 20 carbon atoms in the alkyl group, aralkyl sulfonates, sorbitan monolaurates especially those which are oil soluble and slightly water-soluble, casein and others. From both the economical and technical standpoints, it has been found that the lignin sulfonates, especially the sodium, potassium and calcium lignin sulfonates are the most satisfactory emulsifying or dispersing agents for the preparation of the previously described aqueous dispersions of polymeric organic polysulfides.

The following preparations of aqueous dispersions of specific polymeric organic polysulfides are given to illustrate the preparation of the preferred aqueous dispersions, useful according to my invention. The other organic reactants hereinbefore enumerated can be employed in a like manner to form suitable spray adjuvants. The parts reported in the examples are by weight.

EXAMPLE I

To a mixture of an aqueous solution containing 110 parts of $(NH_4)_2S_{4.5}$ and six parts of sodium lignin sulfonate as a dispersing agent, there was added slowly with vigorous stirring 70 parts of formalin (37%) while maintaining the reaction temperature at about 30° C. by external cooling. After the addition of the formalin solution had been completed, the agitation was continued for about one hour while the temperature of the reaction mixture was maintained at about 30° C. The resulting aqueous dispersion of polymethylene polysulfide after being cooled to about room temperature, was ready for use. The aqueous dispersion of the polymeric polysulfide thus prepared had an average particle size of about 1 to 4 microns and was exceedingly stable.

EXAMPLE II

To a mixture of 480 parts of a 2-molar aqueous solution of $Na_2S_{4.5}$ and six parts of sodium lignin sulfonate as a dispersing agent there was added slowly with vigorous stirring 75 parts of ethylene dichloride while the reaction temperature was maintained at a maximum of 55° C. by external cooling. After the addition of the ethylene dichloride had been completed, the agitation was continued for about one hour while the temperature of the reaction mixture was maintained at 50 to about 55° C. The resulting aqueous dispersion had a particle size of about 1 to 4 microns, but would settle readily. The polyethylene polysulfide formed was washed three times by decantation to remove the sodium chloride formed as a by-product during the condensation. The washed polyethylene polysulfide dispersed readily to a stable latex-like dispersion.

EXAMPLE III

To a mixture of 480 parts of a 2 molar aqueous solution of $Na_2S_{4.5}$ and six parts of sodium lignin sulfonate there was slowly added with vigorous stirring 110 parts of B,B'-dichlorethyl ether while maintaining the reaction temperature at about 65° C. by external cooling. After the addition of the chlorinated ether had been completed, the agitation was continued for about one hour while the temperature of the reaction mixture was maintained at about 60 to 65° C. The resulting aqueous dispersion of the polymeric organic polysulfide thus prepared had an average particle size of about 1 to 4 microns. The condensation product was washed by decantation to remove the sodium chloride formed during the condensation process as in Example II. The washed product redispersed readily.

Each of the above-prepared latex-like aqueous dispersions formed a microscopic, translucent, discontinuous, rubbery film when spread out in a thin layer and allowed to dry, and could not be redispersed even with extremely vigorous rubbing in the presence of water.

Any of the forms of elemental sulphur which are commonly used in the fields of agriculture and horticulture can be employed according to my invention. For example, "flowers of sulphur," "Micronized" sulphur produced in a special air-grinding apparatus "colloidal" sulphur prepared either as a hydrophilic sol or as a hydrophobic sol, as described in the literature, washed flotation sulphur, which is a by-product of the manufacture of fuel gas from coal, and "wettable" sulphurs, which are mixtures of sulphur with a small amount of a wetting agent, can be mixed with the aqueous dispersions of the polymeric organic polysulfides with equal success. Also, lime-sulphur and other alkali and alkaline earth sulfides and polysulfide are extremely compatible with the aqueous dispersions of the polymeric materials described above.

In the following descriptions the elemental sulphur compositions were prepared by first dispersing the sulphur in water by placing the sulphur in a container such as a five-gallon milk can and spraying pressurized water into the container with a spray nozzle, then adding the dispersed sulphur to the aqueous dispersion of the polymeric organic polysulfide, and then diluting the resulting mixture to the desired volume. The lime-sulphur spray compositions were prepared by adding a sufficient volume of an aqueous lime-sulphur solution having a specific gravity of about 1.283 (32° Bé.) to the aqueous solution of the polymeric organic polysulfide solution and diluting the resulting mixture to the desired volume. In actual field tests insecticides were added to some of the spray compositions to accomplish a two-fold purpose with one spray application. Thus, when the lime-sulphur sprays were applied lead arsenate was added for insecticidal activity and hydrated lime was added as a corrective for the lead arsenate. The combination of lime-sulphur with lead arsenate and hydrated lime is a mixture commonly used for horticultural sprays.

The following examples illustrate the use of the specific compositions.

EXAMPLE IV

A 15-year old apple orchard, three acres in size, which contained four varieties of apples: Rome Beauty, McIntosh, Red Delicious and Golden Delicious, was selected for field tests. Since the trees had become heavily infected with scab, *Venturia inaequalis* (Cke) Wint., during the previous year, sources of primary inoculum were excellent. The sprays were applied with a spray unit equipped with a single spray gun at 350 to 400 pounds pressure. Seven sprays were applied at approximately two-week intervals from April 8 to July 4. Three trees of each variety, twelve individuals, were used for each treatment. To secure maximum protection with sulphur alone a sulphur spray of high concentration, 10 lbs. per 100 gal. of water was employed. The results of the use of this sulphur spray was used as a standard for comparison. Polyethylene polysulfide as prepared in Example II at 2 lbs. of solids in combination with sulfur at 10 lbs. per 100 gal. of water was applied to determine compatibility and biological activity of this composition.

Temperature and moisture conditions were ideal for infection throughout most of the spraying season and the unsprayed trees of the more susceptible varieties, Rome Beauty and McIntosh were beginning to defoliate by the middle of June. Weather was cool and rain fell at intervals of about 48 hours throughout May, June and July. Precipitation for May was 7.94 in., for June 5.62 in. and for July 8.83 in. Lesion counts on foliage were used as the index of control of apple scab. Ten branches at the same level around the tree were selected at random on each of the three trees for each variety and the ratio of infected to clean leaves recorded. This involved the counting of about 1500 leaves for each variety for each treatment. On the 25th of June when readings were taken, unsprayed trees were badly damaged by the scab fungus. The foliage had assumed the "suede-finish" characteristic of systematic infection of leaves at the periphery of the tree and had begun to abscise.

Degree of control by the sprays applied for the three most susceptible varieties is indicated in Table 1. Sulphur at a much higher concentration than normally used failed to protect. This was due to rapid removal of spray deposits by rain. The results of the use of the polyethylene polysulfide and sulphur indicate almost perfect protection in that the little infection present consisted chiefly of that developing on unprotected new growth formed in the intervals between spraying. None of the trees of any of the varieties sprayed with the composition of my invention displayed any evidence of damage. Color of foliage of these trees was excellent.

TABLE 1

| Treatment | Percent Infected Leaves | | |
|---|---|---|---|
| | Red Delicious | McIntosh | Rome |
| Control—Unsprayed | 71 | Defoliating | Defoliating |
| 10 lbs. Sulphur/100 gal | 9.0 | 42 | 15 |
| 4 lbs. dispersion of Ex. II and 10 lbs. Sulphur/100 gal | 0.4 | 0.9 | 1.0 |

The degree of scab control on the fruit under slightly different treatment in another section of the orchard is indicated below in Table 2 for the varieties Red Delicious and McIntosh. The spray compositions were prepared and applied as described above. The percentage infected fruit is given for mature fruit.

TABLE 2

*Variety McIntosh*

| Treatment | Average Per Cent Infected Fruit |
|---|---|
| Control (Unsprayed) | Substantially 100. |
| 6 lbs. Wettable Sulphur/100 gal | 34. |
| 1 lb. dispersion of Ex. II and 3 lbs. wettable sulphur/100 gal | 29. |

*Variety Red Delicious*

| Treatment | Average Percent Infected Fruit |
|---|---|
| Control (Unsprayed) | 100 |
| Flotation Sulphur Paste [1] 12, 10 and 8 lbs. per 100 gallons | 22 |
| 4 lbs. dispersion of Ex. II and Flotation Sulphur Paste [1] 12, 10 and 8 lbs. per 100 gallons | 4.0 |

[1] Variable dosages of flotation sulphur paste (45% sulphur) represent prebloom, bloom and first cover dosages respectively.

Additional evidence of this resistance to weathering of spray deposits is illustrated in Table 3 by the sulphur values for the leaves six weeks after the last spray composition had been applied. During this six weeks the deposit was subjected to 9.7 inches of intermittent rainfall. Mature leaves of comparable age were collected from McIntosh trees and the area of the leaves was determined by a planimeter from the outline of the leaves traced on paper. 25 leaves were obtained from the trees of each experimental group. The leaves were dried and the sulphur content ascertained by the method of Parks et al. as reported in Industrial and Engineering Chemistry, Analytical Edition, 15: 527–533, 1943.

TABLE 3

| Spray | Percent Sulphur, dry wt. basis | Mgm. S per sq. in. leaf surface |
|---|---|---|
| Sulphur only 10 lbs./100 gal | 0.31 | 0.19 |
| 4 lbs. dispersion of Ex. II and 10 lbs. sulphur/100 gal | 1.84 | 1.09 |

The high sulphur values for apple leaves sprayed with the polyethylene polysulfide sulphur composition relative to that of leaves sprayed with sulphur are convincing evidence of the tenacity and resistance to weathering of spray deposits containing this polymeric organic polysulfide. Analysis also shows that the polymer is an excellent adhesive for sulphur.

EXAMPLE V

In an adjoining commercial orchard of several acres of mature Baldwin and McIntosh trees, dusting with sulphur was practiced for the control of scab. Rapid removal of sulphur by the frequent rains the last week of April and the first week of May combined with ideal conditions for spore germination resulted in a heavy infection of foliage. On May 6, polyethylene pentasulfide at 1 lb. of solids with lime-sulphur at 1 gal. of commercially available 32° Bé. solution and with arsenical, 5 lbs. lime and 5 lbs. lead arsenate, per 100 gal. of water was applied to destroy, or "burn-out," infected areas of tissue (scab lesions). The scab was eradicated without apparent injury to the foliage. Two gallons of commercially available lime-sulphur per 100 gallons of water, which is normally used for "burning out" scab lesions endangers the foliage. Later in the season, June 5, polyethylene pentasulfide was again used with lime-sulphur of the same concentration in a mixed insecticidal spray of nicotine sulfate and arsenicals for the eradication of scab in another unit of the same orchard. Here, too, the lesions were destroyed without apparent injury to the foliage.

The aqueous dispersions described in Examples I and III have also been employed in preparing similar spray compositions and gave results equal to those described above. In fact, any of the hereinbefore described aqueous dispersions of polymeric organic polysulfide may be used if desired.

The above specific concentrations of the toxicants can be varied to suit the purposes and conditions for which they are to be used. In general, the sulphur concentrations employed for horticultural spray purposes, varies from about one pound of sulphur, dry basis, to about 6 pounds per 100 gallons of spray while the concentrations of lime-sulphur vary from about 2 to about 5 pounds, on a dry basis, per 100 gallons of spray. But for unusual conditions of heavy infestation of certain insects and fungus diseases, the sulphur concentration will be 10 pounds or more per 100 gallons of spray and the lime-sulphur concentration will be as high as 25 pounds, on a dry basis, per 100 gallons to control heavy infestations of "leaf curl" on peach trees. For any of the concentrations of sulphur and the usual concentrations of lime-sulphur, it is necessary to use only about one pound to about 5 pounds of an aqueous dispersion of a polymeric organic polysulfide containing 50% of the polysulfide by weight, but for the higher concentrations of lime-sulphur 6 to 10 pounds of the 50% aqueous dispersion of the polysulfide will be necessary to prepare spray compositions which will result in satisfactory spray deposits.

Although I have disclosed specific examples of my invention, I do not thereby desire or intend to limit myself solely thereto, for, as hitherto stated, the precise proportions of the materials utilized may be varied and other materials having equivalent biological or physical properties may be employed, if desired, without departing from the spirit and scope of the invention as defined in the appended claims.

This application is a continuation-in-part of my copending application Serial No. 599,316, filed June 13, 1945, now Patent No. 2,470,115.

I claim:

1. A composition comprising a stable dispersion of one to five parts by weight of particles of polyethylene polysulfide of a size no greater than 10 microns in diameter dispersed in an aqueous solution of a lignin sulfonate, said polysulfide containing 3 to 5 sulfur atoms per molecular unit, and also comprising from 1 to 20 parts by weight of separate particles of a material selected from the class consisting of sulfur and lime sulfur.

2. A composition comprising 1 to 10 parts by weight of particles of elemental nulfur and 1 to 5 parts by weight of separate particles of polyethylene polysulfide of a size no greater than 1 to 3 microns in diameter dispersed in an aqueous solution of a lignin sulfonate, said polysulfide containing 3 to 5 sulfur atoms per molecular unit.

3. A composition comprising 1 to 20 parts by weight of lime-sulfur and 1 to 5 parts by weight of separate particles of polyethylene polysulfide of a size no greater than 1 to 3 microns in diameter dispersed in an aqueous solution of a lignin sulfonate, said polysulfide containing 3 to 5 sulfur atoms per molecular unit.

WILLIAM D. STEWART.

REFERENCES CITED

The following references are of record in the file of this patent:

UNITED STATES PATENTS

| Number | Name | Date |
|---|---|---|
| 2,043,941 | Williams | June 9, 1936 |
| 2,102,564 | Bonstein | Dec. 14, 1937 |
| 2,142,145 | Patrick | Jan. 3, 1939 |

OTHER REFERENCES

Martin: "The Principles of Plant Protection," 2d Ed. (1036), pages 102-104, 109, 113-119. (Copy in Div. 43.)